United States Patent [19]

Mori et al.

[11] Patent Number: 5,040,142

[45] Date of Patent: Aug. 13, 1991

[54] METHOD OF EDITING AND CIRCULATING AN ELECTRONIC DRAFT DOCUMENT AMONGST REVIEWING PERSONS AT REMOTE TERMINALS ATTACHED TO A LOCAL AREA NETWORK

[75] Inventors: Kenjiro Mori, Machida; Yoshiyuki Nakayama, Yokohama; Toshiro Nose, Isehara, all of Japan

[73] Assignee: Hitachi, Ltd., Tokyo, Japan

[21] Appl. No.: 302,789

[22] Filed: Jan. 27, 1989

[30] Foreign Application Priority Data

Jan. 29, 1988 [JP] Japan .................................. 63-20920

[51] Int. Cl.⁵ ...................... G06F 15/46; G06F 15/60; G09B 7/00

[52] U.S. Cl. ............................... 364/900; 364/918.5; 364/927.66; 364/927.96; 364/943; 364/943.1; 364/949.91; 364/962.1; 364/507

[58] Field of Search ... 364/200 MS File, 900 MS File, 364/507; 434/336; 340/712; 235/435; 382/8, 36, 41, 57

[56] References Cited

U.S. PATENT DOCUMENTS

| | | | |
|---|---|---|---|
| 4,404,649 | 9/1983 | Numley et al. | 364/900 |
| 4,417,322 | 11/1983 | Berry et al. | 364/900 |
| 4,498,147 | 2/1985 | Agnew et al. | 364/900 |
| 4,503,499 | 3/1985 | Mason et al. | 364/200 |
| 4,513,391 | 4/1985 | Maddock | 364/900 |
| 4,532,588 | 6/1985 | Foster | 364/200 |
| 4,641,250 | 2/1987 | Strong | 364/507 |
| 4,648,061 | 3/1987 | Foster | 364/900 |
| 4,658,351 | 4/1987 | Teng | 364/200 |
| 4,754,428 | 6/1988 | Schultz et al. | 364/900 |
| 4,786,896 | 11/1988 | Harte | 340/712 |
| 4,820,167 | 4/1989 | Nobles et al. | 434/336 |

Primary Examiner—Stuart N. Hecker
Assistant Examiner—George C. Pappas
Attorney, Agent, or Firm—Fay, Sharpe, Beall, Fagan, Minnich & McKee

[57] ABSTRACT

In a communication system which is arranged to circulate an addressed electronic document among a plurality of terminals which are connected to one another through a transfer path and to sequentially add attest patterns indicative of the approvals of individual reviewing persons to the electronic document, a method for identifying the source of each person's approval symbol and amendments to the document. The data structure of each electronic document communicated between individual terminals is assembled in a data structure which separates the document content data from the attest patterns added to the document by the creating or reviewing person. If any reviewing person requests to amend the contents of the electronic document to which the attest patterns have been added, a display of only the content data of the above electronic document is presented to the reviewing person. The reviewing person then amends the content data of the document, the prior approval of the document is removed and the thus amended electronic document is recirculated.

3 Claims, 16 Drawing Sheets

FIG. 8A
50

| 500 | 502 | 503 | 504 | 505 | 506 | 507 | 508T | 508B | 508L | 508R | 509 | 510 | 511 |
|---|---|---|---|---|---|---|---|---|---|---|---|---|---|
| DOCUMENT DATA NO. | TITLE | DATE | PAPER SIZE | PAPER DIRECTION | CHARACTER PITCH | LINE PITCH | TOP | BOTTOM | LEFT | RIGHT | NUMBER OF PAGE | SEAL IMAGE REGION NO. (POINTER) | PAGE MANAGEMENT DATA NO. (POINTER) |

SPACE spans 508T–508R.

FIG. 8B
52

| 520 | 521 |
|---|---|
| PAGE MANAGEMENT NO. | POINTER TO FIRST REAGION MANAGEMENT DATA |

FIG. 8C
54

| 540 | 541 | 542 | 543 | 544 | 545 | 546 | 547 |
|---|---|---|---|---|---|---|---|
| REGION NO. | LT | RB | REGION PROPERTY | SORT OF DATA | SEQUENCE NO. OF CONTINUOUS REGION | CONTENTS OF DATA | NEXT REGION NO. |

FIG. 9A

| CONTENTS DATA NO. (561) | TEXT DATA (562) | 56-1 |

FIG. 9B

| CONTENTS DATA NO. (561) | FIGURE NO. (562A) | SORT OF FIGURE (562B) | FIGURE PARAMETER (562C) | FIGURE NO. (562A) | ...... | 56-2 |

FIG. 9C

| CONTENTS DATA NO. (561) | CODED IMAGE DATA (562) | 56-3 |

FIG. 9D

| CONTENTS DATA NO. (561) | CODED SIGNET (OR SIGNATUER) IMAGE DATA (562) | 56-4 |

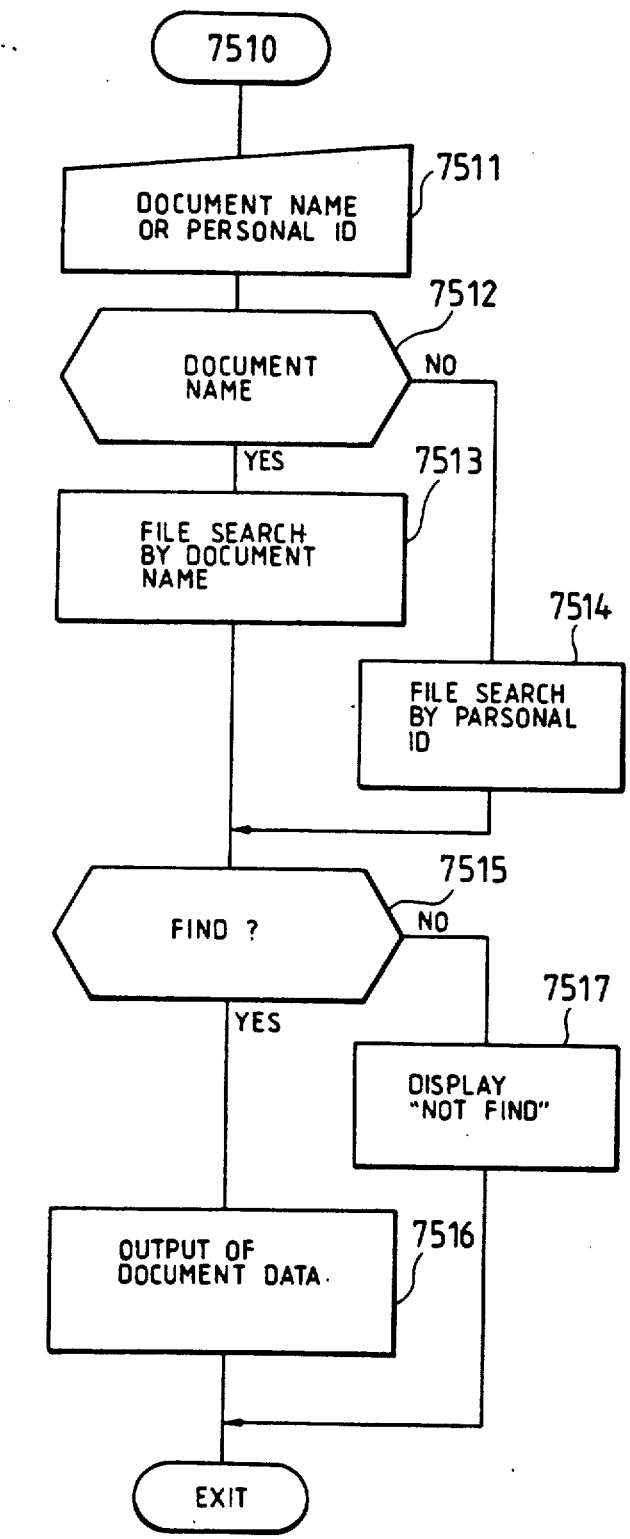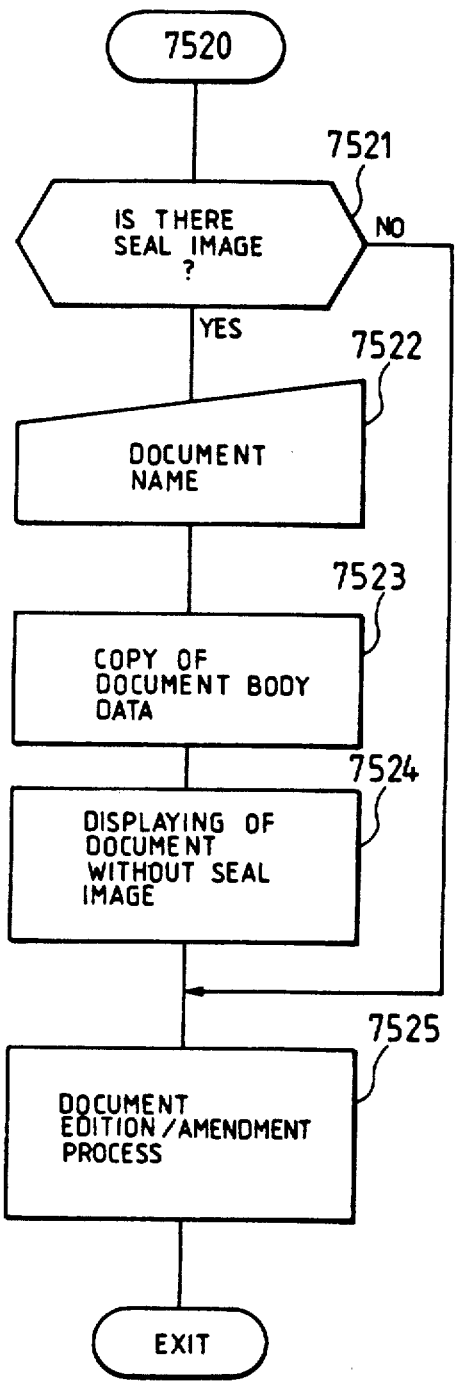

METHOD OF EDITING AND CIRCULATING AN ELECTRONIC DRAFT DOCUMENT AMONGST REVIEWING PERSONS AT REMOTE TERMINALS ATTACHED TO A LOCAL AREA NETWORK

BACKGROUND OF THE INVENTION

1. Field of the Invention

The present invention relates to a method of and an apparatus for editing electronic documents. More specifically, the method and the system relate to editing an electronic document in which the electronic document is circulated sequentially from one terminal to another terminal through a network with symbols. These symbols, also known as signets or signatures, represent the consent of document reviewers or editors. These symbols are sequentially added to the electronic document.

2. Description of the Prior Art

In the field of a system arranged to circulate an electronic document among a plurality of terminals through a network or an electronic mail system, several proposals have heretofore been made with respect to the protection of the entire electronic document or the prevention of forgery of the same in the course of circulation. For example, with regard to the following problems:

(1) A third party may view or destroy the contents of a document in the course of transfer of the document from one person to another person, and (2) Another participant may edit, without permission, a document which has been approved by a certain person;

The following proposals for these problems have been made in:

(i) Computer Today, 1987/1, No. 7, pp. 38-43, and (ii) lecture papers published in the 32nd national meeting (the first term of 1986) of Joho Shori Gakkai (Information Processing Society).

However, these problems have persisted in an electronic document editing system arranged to sequentially circulate an electronic document among a plurality of participants who can edit a document and who must consent to the amendments to the document.

In a method of circulating among participants a non-electronic document, usually in paper form, the first person upon approving the document affixes a seal or a signature representing his approval. (In the present specification, information added to a document to express approval is called an "attest pattern".) If the second person makes an addition or an amendment to the above document, he affixes his attest pattern. Normally, the addition or the amendment is handwritten. From the style of the handwritten characters, it is possible to determine how and by whom the document were amended or what portion of the contents of the document was approved by the participants.

In the editing of electronic documents, it is impossible to determine whether the contents of a document and an attest pattern which are output to a CRT screen or a printer are those of the original or a copy. As a result, if the contents of the electronic document are amended during circulation, it is impossible to determine whether approval has been obtained before or after the amendment. To prevent the contents from being amended after sealing or signing, it has heretofore been customary to design a communication system so that the documents cannot be amended during sending or receiving.

However, in general offices, it is common practice that a document can be referred to and altered by some persons before the contents have been officially authorized. Knowing who approved the document at any time in the course of reviewing would be important. There may also be a case where a document which has been approved by one reviewer is altered by another reviewer and returned to the first reviewer. In such a situation, the inability to amend the document is a severe limitation.

What is desired in the field of OA (Office Automation) is to electronically arrange a process in which a document is circulated among, and reviewed or amended by, a plurality of persons until the document is completed, thereby improving the efficiency of document creation. Each participant should be able to amend the contents of the document. Once an amendment is added, the approvals which have previously been given should be reset and the approvals of the relevant participants be again requested.

SUMMARY OF THE INVENTION

It is, therefore, an object of the present invention to provide a method for editing an electronic document which enables amendment of the electronic document without permitting others to affix an attest pattern such as a seal image or a signature image, as well as a communication system for use with such an electronic document.

To achieve the above object, the present invention structures each electronic document communicated between individual terminals so that the document content data is separate from the attest patterns added by a document creating or reviewing person. If any reviewing person requests to amend the contents of the electronic document to which the attest patterns have been added, a terminal will display the content data of the above electronic document only. Then the reviewing person amends the content data, and the thus amended electronic document is formulated.

The foregoing and other objects, advantages, manner of operation and novel features of the present invention will be understood from the following detailed description when read in connection with the accompanying drawings.

BRIEF DESCRIPTION OF THE DRAWINGS

FIG. 8A is a diagram showing one example of the record format of document management data in the present invention;

FIG. 8B is a diagram showing one example of the record format of document management data in the present invention;

FIG. 8C is a diagram showing one example of the record format of page management data in the present invention;

FIG. 9A is a diagram showing one example of the record format of text data in the present invention;

FIG. 9B is a diagram showing one example of the record format of figure data in the present invention;

FIG. 9C is a diagram showing one example of the record format of image data in the present invention;

FIG. 9D is a diagram showing one example of the record format of seal image data in the present invention;

FIG. 17 is a flow chart showing the details of the refer/print routine of FIG. 16;

FIG. 18 is a flow chart showing the details of the amendment routine of FIG. 16;

DESCRIPTION OF THE PREFERRED EMBODIMENTS

Embodiments of a method of and a system for editing documents in accordance with the present invention will be described below with reference to the accompanying drawings.

Figure 1:
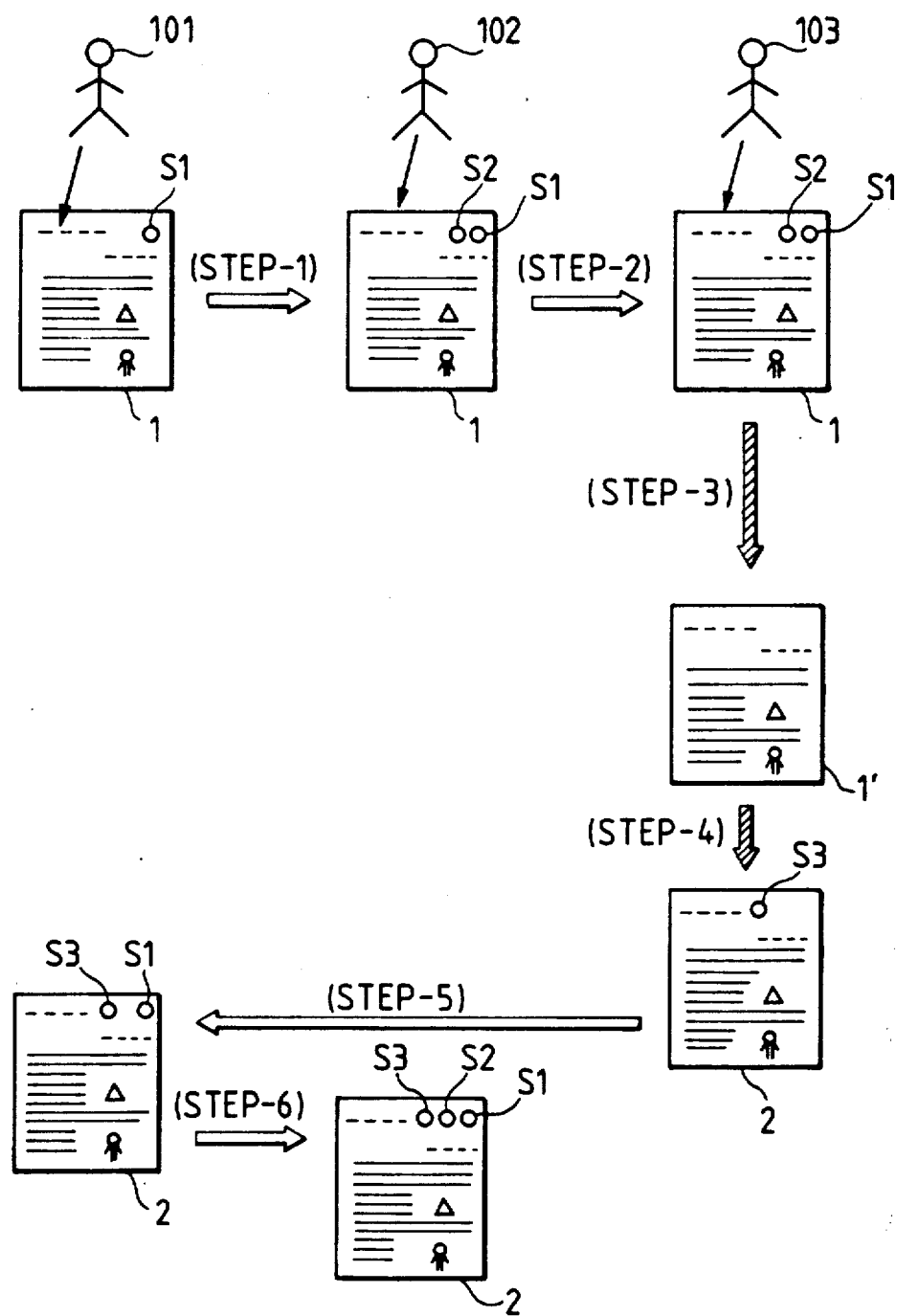
FIG. 1 is a view which serves to diagrammatically illustrate a method of editing a document in accordance with the present invention.

FIG. 1 shows the process in which a person 101 who has created or drafted an electronic document 1 circulates the document 1 among two persons 102 and 103 to obtain their approval.

As will be described later, the document creating person 101 and the persons 102 and 103 who review and attest the document 1 register in advance seal image data representing their attest seals in their respective document processing terminals (or work stations). Such seal image data may be replaced with image data representing their signatures, and may be input from an image input device each time the seal image data is used with a document.

In the example shown in FIG. 1, the document creating person 101 sends the document 1, to which the seal image S1 of his own is affixed, to the first reviewing person 102 (Step 1), and the reviewing person 102 affixes his seal image S2 to the document 1 to transmit the same to the reviewing person 103 (Step 2).

In the present invention, when the second reviewing person 103 adds an amendment to the contents of the received document 1, the work station operated by the reviewing person 103 refuses any processing other than the addition of seal image data to the received document 1, eliminates the seal images S1 and S2 from the received document 1, and outputs the resultant copy 1' of the document body to a display screen (Step 3). The reviewing person 103 then amends the contents of the document copy 1' and adds his seal image S3 thereto (Step 4). The reviewing person 103 designates the recirculation of a document 2 having the amended contents among the creating person 101 and the reviewing person 102, and transmits the document 2 to the next reviewing person (in this example, the creating person 101) (Step 5). The creating person 101 affixes the seal image S1 to the received amended document 2 and sends it to the first reviewing person 102 (Step 5). When the first reviewing person 102 approves the contents of the received document 2 and adds the seal image S2 thereto, a formal document which has received the content of all the persons concerned is obtained.

Figure 2:
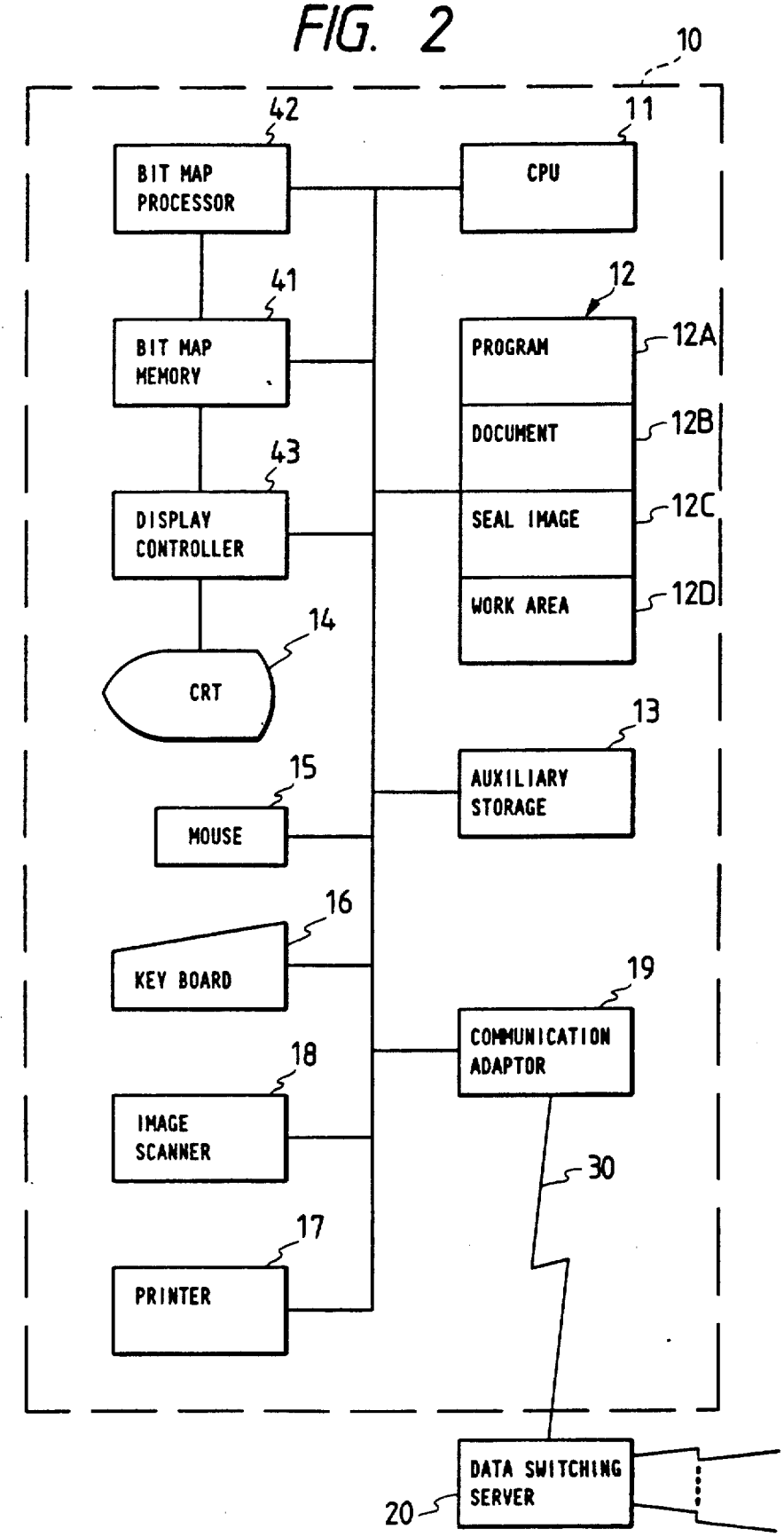
FIG. 2 is a block diagram showing the construction of a work station in which document editing according to the present invention is practiced.

FIG. 2 shows the construction of a document editing work station 10.

The work station 10 includes the following elements: a processor (CPU) 11 for executing each program such as displaying and editing of a document, sealing or replacement as well as an associated control program for controlling peripheral units; a memory 12 constituted by a program memory area 12A, a work and memory area 12B for document data to be edited, a memory area 12C for seal-image registration data, and a work area 12D; an external storage device for storing created document data and document data received from another work station 13; a display device (CRT) 14, a bit map memory 41 which allows writing of data, such as document data or operation guidance, to be displayed on the display device 14; a bit map processor 42 for controlling writing of data into the bit map memory 41; a display device controller 43 for outputting the contents of the bit map memory 41 to the CRT 14; a coordinate input device (i.e. mouse) 15 for designating a position on the screen of the display device 14; a keyboard printer 16 used for inputting character codes; a printer 17; an image input device 18 used for reading of data such as a photographic image, a seal image or a signature; and a communication adapter 19 for sending and receiving data to and from a communication line 30. The aforesaid work station 10 is connected through the communication line 30 to a document data switching (or distribution) server 20 for effecting collection, delivery and sorting of document data. The switching server 20 serves to send the document data transmitted from one work station to another work station.

Figure 3:
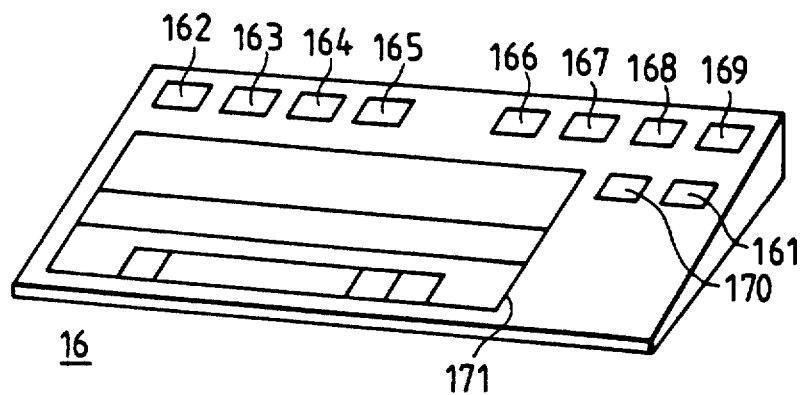
FIG. 3 is a diagrammatic view showing the external appearance of a keyboard for use in the present invention.

FIG. 3 shows an example of the layout of keys on the keyboard 16. The following elements are arranged on the keyboard 16: an image input key 161, a seal-image designating key 162; a seal-image/ password changing key 163, a sealing key 164, a continuous sealing key 165, a sending key 166, a received-document extracting key 167, a document print key 168, a key 169 for setting and cancelling an editing region; a command key 170 for enabling editing in a region of a document; and a character key 171.

Figure 4:
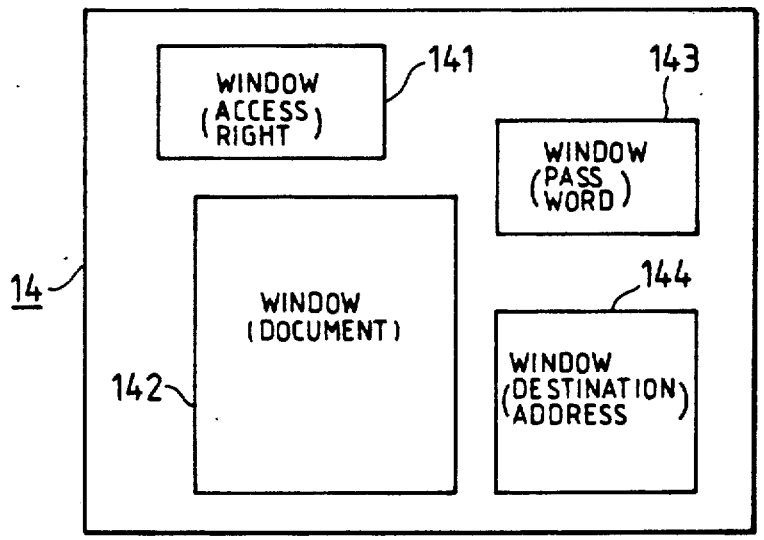
FIG. 4 is a schematic view showing one example of a CRT screen for use in the present invention.

Each of the work stations for editing documents displays on the CRT 14. An example, of work station's CRT 14 display used for editing documents is shown in FIG. 4. The display consists of a window 141, provided for creating access to a document, a window 142 for displaying the contents of an electronic document which is being created or which has been received from another work station, a window 143 provided for inputting a password assigned to each user so as to read out registered seal image data, and a window 144 provided for designating the destination address of a document.

Figure 5:
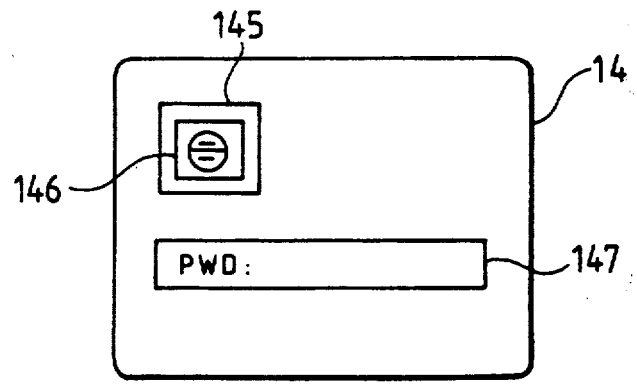
FIG. 5 is a schematic view showing one example of a CRT screen for use in registering seal image data in the present invention.

In addition, as shown in FIG. 5, during registration of seal image data, the following two windows are displayed: a seal-image target data displaying window 145 for displaying seal image data 146 input from the image input device or image scanner 18 and a window 147 provided for setting a password used to read out the seal image after the registration thereof.

Figure 6:
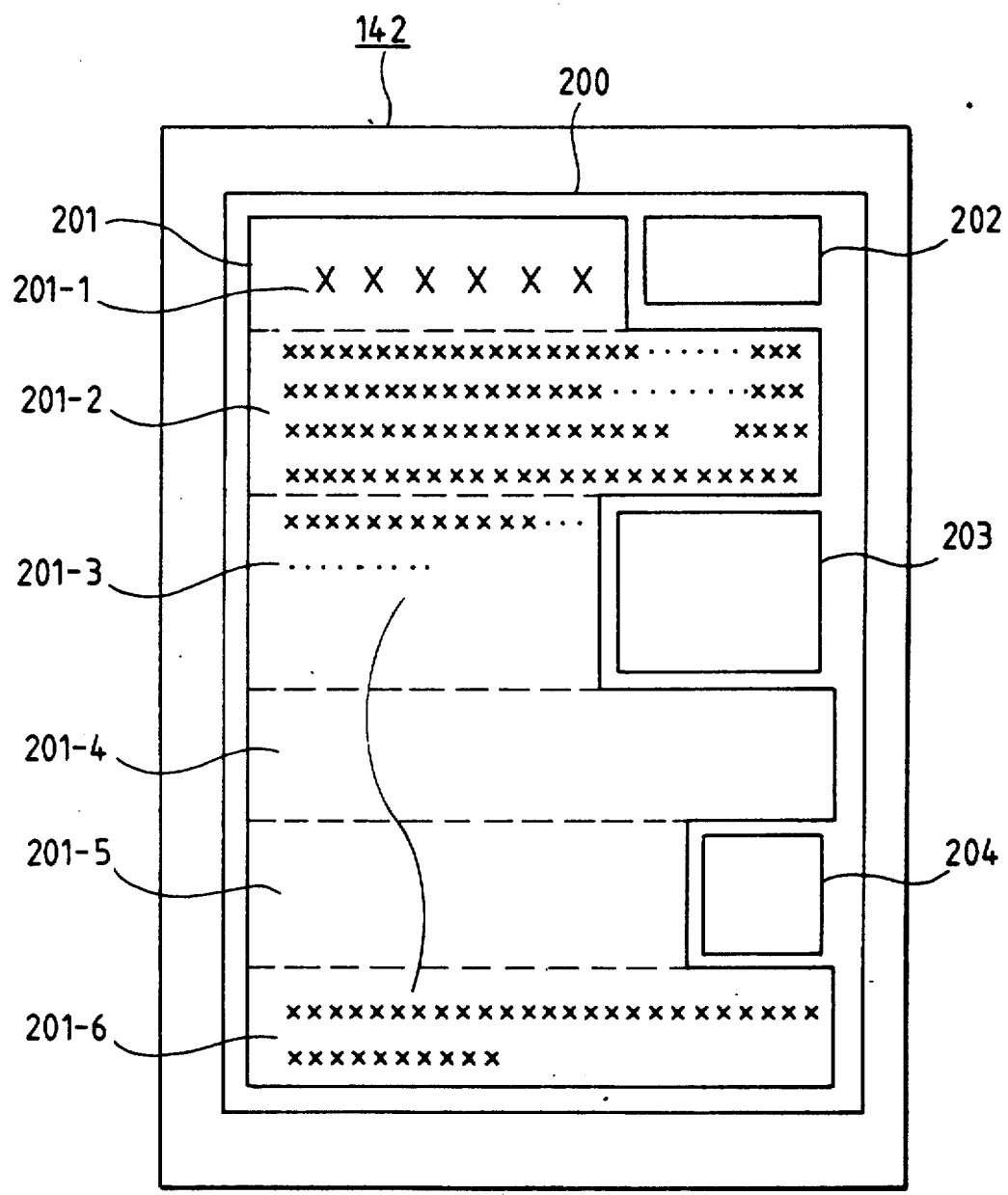
FIG. 6 is a schematic view showing one example of the contents displayed in a document display window in the present invention.

FIG. 6 shows an example of the contents displayed in the document display window 142. Within the document display window 142, a basic region 200 indicative of a range which allows writing of information by a user is set in advance, and the contents in the basic region 200 constitute those of an electronic document for one page. Each page of the document is constituted by a plurality of regions corresponding to the nature of information. In the example of FIG. 6, the document is composed of a text region 201, an image-seal region 202, a figure region 203, and an image region 204. Each of the regions may be constituted by a plurality of regions as long as the size permits. If one region has its rectangular shape partially deformed by the provision of another region 202-204 as shown by, for example, the text region 201 in FIG. 6, such a region is divided into rectangular subregions 201-1 to 201-6 and data management is executed in units of the rectangular subregions.

Figure 7:
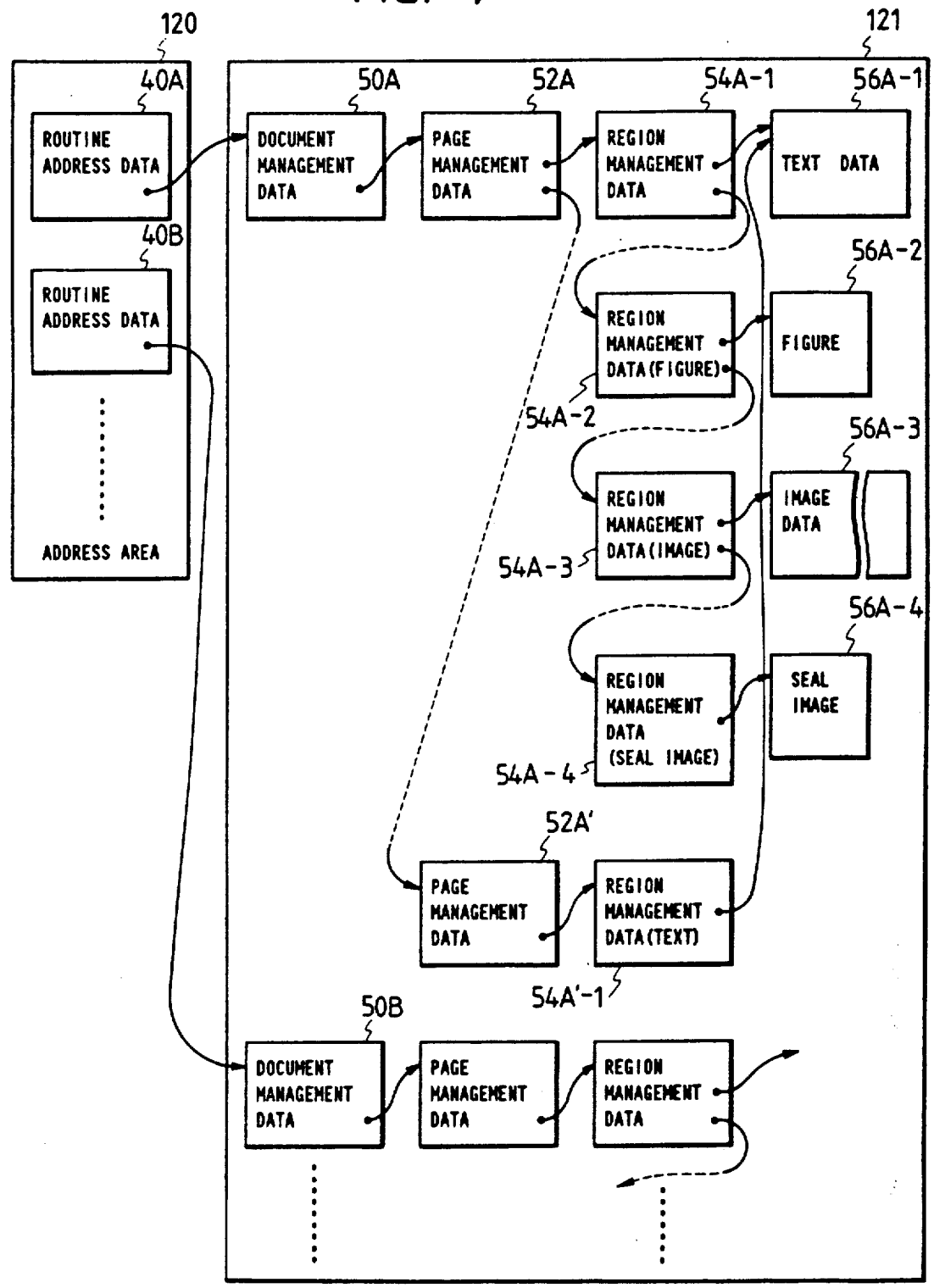
FIG. 7 is a block diagram which serves to illustrate the structures of destination address data and document data in the present invention.

FIG. 7 shows the structure of destination address data and document data. In the figure, a memory area for storing the destination address of a circulating document is indicated at 120, and is arranged to store routine address data records 40 (40A, 40B, ...) which will be described in detail in connection with FIG. 10. The respective routing address data records 40 correspond to document management data 50 (50A, 50B, ...), by means of a pointer, which is stored in a document data memory area 121.

Each document is composed of document management data 50, page management data 52, region management data 54, and document content data 56 corresponding to each region. The page management data 52 is prepared in units of pages which constitute one document and, for example, the presence of page management data 52A' for a second page can be detected through a pointer in page management data 52A for a first page. If a document for one page is constituted by a plurality of regions, region management data 54A-1 to 54A-4 is prepared for the respective regions, and all the region management data is chained in such a manner that one of them is indicated by the pointer contained in the page management data with the next region management data indicated by the pointer contained in the region management data. The document content data contained in the individual regions are stored in separate areas, for example, indicated at 56A-1 to 56A-4 in accordance with the kind of data, and all the document management data is made to correspond to the region management data by the respective pointers.

The document content data can be made to correspond to a plurality of region management data. For example, if the text region 201 is constituted by a plurality of subregions as described in connection with FIG. 6, region management data is prepared for each of the subregions and the text data is sequentially loaded into these subregions.

FIG. 8A shows the record format of the document management data 50. A document data number is indicated at 500, the title of a document at 502, the date of creating document data at 503, a code indicative of the sheet size of the document at 504, a code indicative of the position (horizontal or vertical) of a sheet at 505, a code indicative of character pitch at 506, a code indicative of line pitch at 507, the sizes of the top margin, bottom margin, left margin and right margin of the sheet at 508T-508R, respectively, and the number of pages constituting the document at 509. Reference numeral 510 denotes a pointer indicating the region in which the first seal image data added to the document is stored, and reference numeral 511 denotes a pointer indicating the page management data (record) 52 for the first page.

FIG. 8B shows the record format of the page management data 52. In the figure, reference numeral 520 denotes the number of the page management data and reference numeral 521 denotes a pointer indicating the region management data 54 for the first region.

FIG. 8C shows the record format of the region management data 54. In the figure, reference numeral 540 denotes a region number, reference numeral 541 denotes coordinates indicative of the position of the left top corner of the relevant region, reference numeral 542 denotes coordinates indicative of the position of the right top corner of the region, reference numeral 543 denotes a code indicative of region properties which define, for example, whether the region is an independent region or a region overlapping another region, reference numeral 544 denotes a code indicating the kind of data written in the region (such as text, figure, image, seal image or sound), reference numeral 545 denotes a serial number which is used when an identical kind of data (for example, a text) is continuously fed into a plurality of regions or subregions, the serial number indicating the sequence number of the relevant region in a plurality of continuous regions, reference number 546 denotes a pointer indicating a memory area for data to be written into the above region, and reference numeral 547 denotes a pointer indicating the region management data corresponding to the next region.

FIGS. 9A to 9D respectively show the record data formats of text data 56-1, figure data 56-2, image data 56-3 and seal image data 56-4. Each of the data records is composed of a content data number 561 and a data section 562. In the case of the figure data, a figure element number 562A, a code 562B indicative of the kind of figure element (such as, rectilinear, rectangular, polygonal, circular or arcuate) and a parameter 562C used to define the figure element are prepared as a set of data. Image data and seal image data are stored in a compressed coded form in order to decrease the amount of data to be stored.

Figure 10:
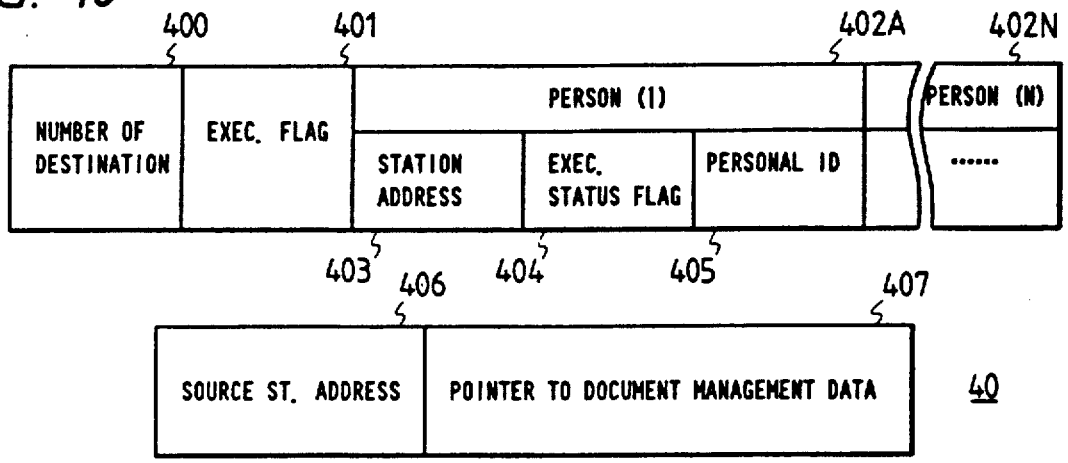
FIG. 10 is a diagram showing one example of the record format of routing address data n the present invention.

FIG. 10 shows the record format of routing address data 40. The illustrated record is composed of the number of destinations (receiving stations), denoted by 400, a flag 401 indicative of whether or not approval with a seal or a signature is needed at each of the destinations, station addresses 403 (403A, 403B, ...) indicative of receiving stations (402A, 402B, ...), flags 404 (404A, 404B, ...), respectively, personal identification numbers 405 (405A, 405B, ...) assigned to individual persons who receive a document, a station address 406 indicative of the sending station of the document (or person who has created of drafted the document), and a pointer 407 to the document management data record 50.

If document data is to be transmitted from one station to another station (or the document data switching server), the above-described routing address data record 40 and the document data 50 to 56A are assembled into one communication frame. In this case, the above-described pointers to the respective data records are eliminated and the communication frame is assembled in such a manner that the routing address data, the document management records which can be discriminated by means of the respective headers, the page management records, the region management records and the document content data records are arranged in that order.

Figure 11A:
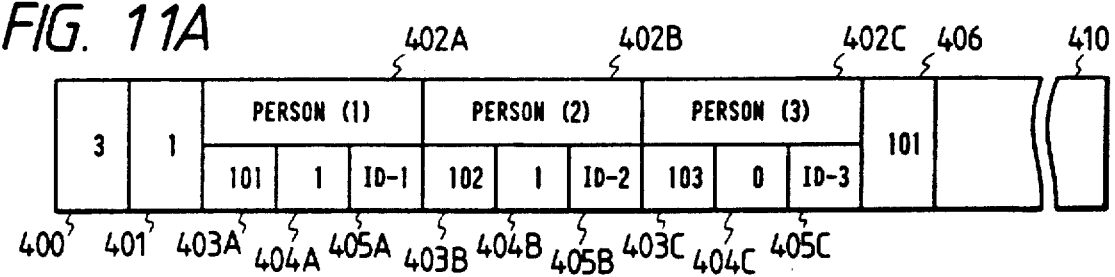
FIGS. 11A to 11C are diagrams which respectively serve to illustrate the contents of the routing address data in Steps 1 to 6 in FIG. 1.

FIG. 11A shows the status of a frame portion corresponding to the routing address data record in Step 2 of FIG. 1. In the figure, station addresses are denoted by reference numerals which are identical to those of the creating person 101 and the reviewing persons 102, 103. In Step 2, since the creating person 101 and the first reviewing person have completed sealing, the review status flag 404A and 404B are set to "1", respectively.

Figure 11B:
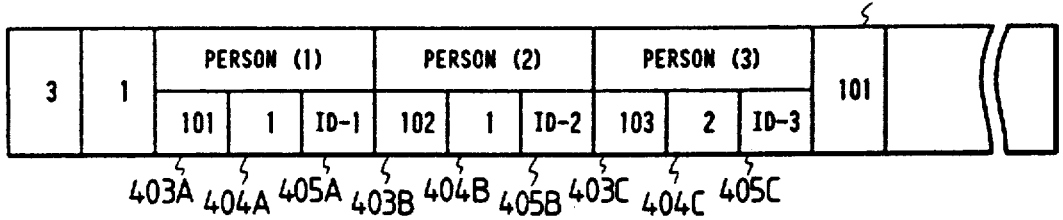

FIG. 11B shows the status of the routing address data record when the second reviewing person 103 is to amend the contents of the document (Step 3). In this case, the flag 404C represents a code "2" indicative of the disapproval of the second reviewing person 103.

Figure 11C:
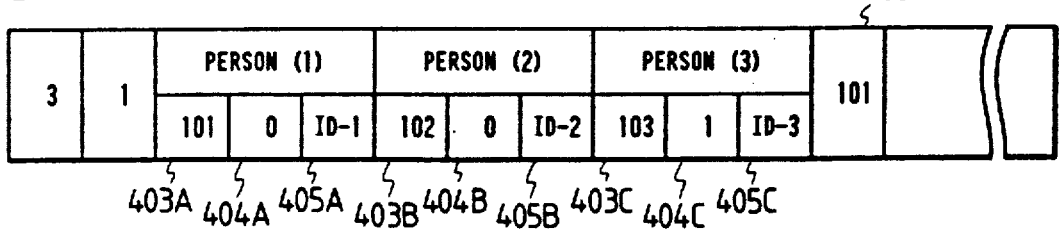

FIG. 11C shows the status of the routing address data record in Step 5 in which the second reviewing person 103 transmits his corrected document data to the creating person 101. When the contents of the document are corrected, the reviewing of both the creating person 101 and the first reviewing person 102 are needed. Accordingly, the flags 404A and 404B are cleared (to "0").

Incidentally, in FIGS. 11A to 11C, reference numeral 410 denotes a field which contains various document data such as the document management data.

Next, changes in the structure of document data which correspond to the respective steps of FIG. 1 will be explained with reference to FIGS. 12A to 12F.

Figure 12A:
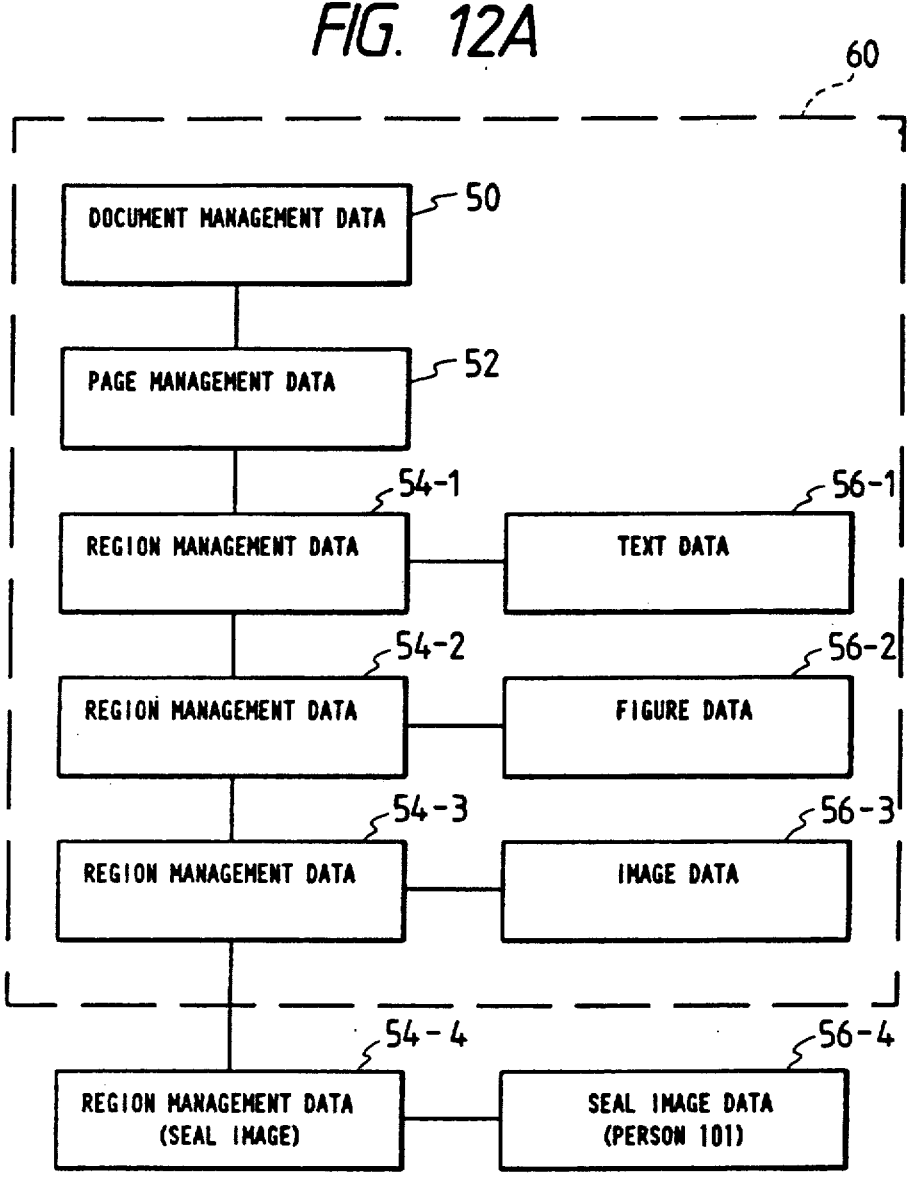
FIGS. 12A to 12F are diagrams which respectively serve to illustrate the contents of the routing address data in Steps 2, 3 and 5 in FIG. 1.
Figure 12B:
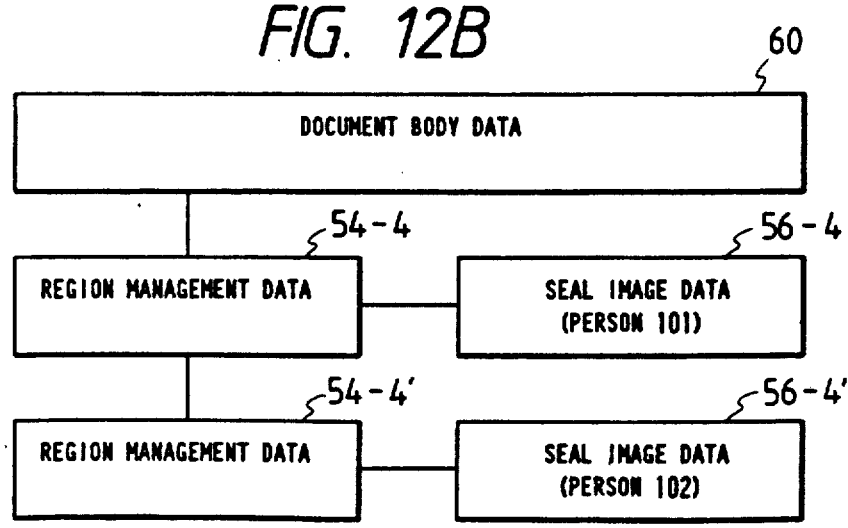

FIG. 12A shows the structure of document data when the document creating person 101 has affixed his seal image S1 thereto (Step 1). At this time, the document data contains the document management data 50, the page management data 52, the text data 56-1, the figure data 56-2, the image data 56-3, the region management data 54-1 to 54-3 prepared for the respective data 56-1 to 56-3, the seal-image data 56-4 of the document creating person 101, and the region management data 54-4 corresponding to the seal image data 56-4. For convenience of explanation, if all the document data other than the seal image 56-4 and the region management data 54-4 is defined as document body data 60, the structure of the document data when the first reviewing person 102 has affixed his seal image S2 assumes a form in which the seal image data 56-4' of the reviewing person 102 and the corresponding region management data 54-4' are added to the data structure of FIG. 11B as shown in FIG. 12B.

Figure 12C:
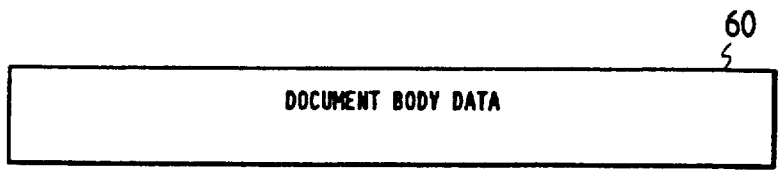

In the present invention, when the second reviewing person 103 is to amend the contents of the document, data relative to the seal images S1 and S2 is separated from the document data as shown in FIG. 11B and the document body data 60 shown in FIG. 12C becomes an object to be amended by the second reviewing person (Step 3).

Figure 12D:
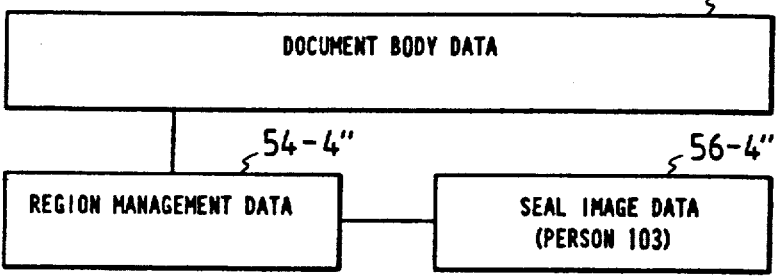

When the second reviewing person 103 has amended the document body data 60 and affixed his seal image S3 thereto (Step 5), the data structure assumes the form shown in FIG. 12D. In the figure, reference numeral 60' denotes the document body data which is partially amended, reference numeral 56-4' denotes the seal image of the reviewing person 103, and reference numeral 54-4" denotes region management data for a seal-image region.

Figure 12E:
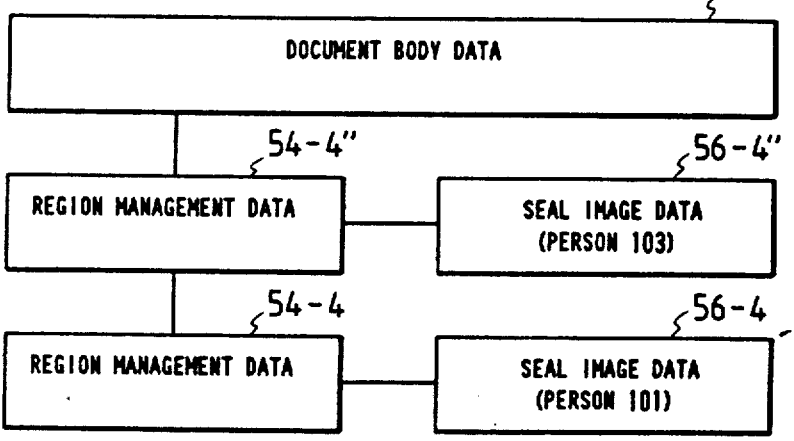
Figure 12F:
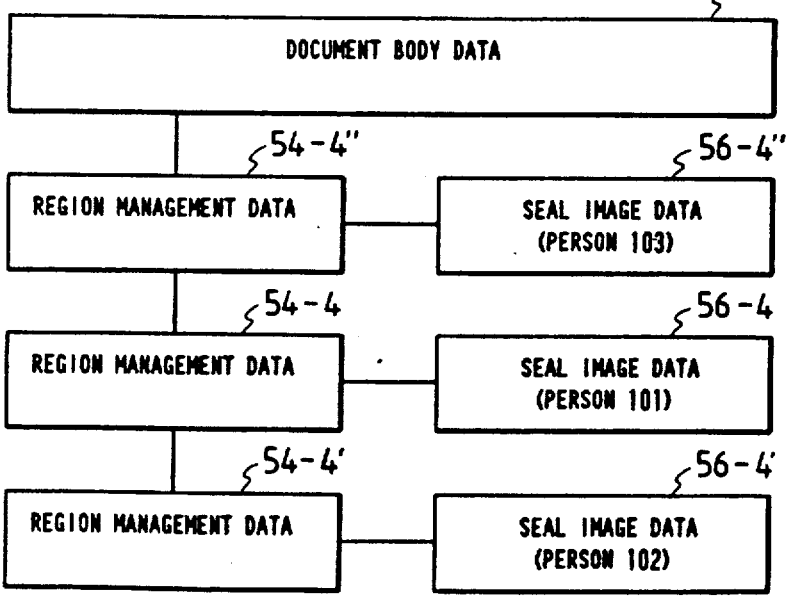

FIG. 12E shows the data structure when the document creating person 101 has affixed his seal image S1 to the document received from the second reviewing person. FIG. 12F shows the data structure when the first reviewing person 102 has again affixed his seal image S3.

As is evident from the foregoing, the present invention is characterized in that the document content data and the attest data such as seal image data or signature data, are contained in separate document data structures. If a request for any amendment other than the addition of the attest data arises, only the amendment of the document content data from which the attest data is removed is allowed. Thus, the contents of the document which has been previously approved cannot be amended without removing the seal image. This prevents creation of improperly authorized data.

Figure 13:
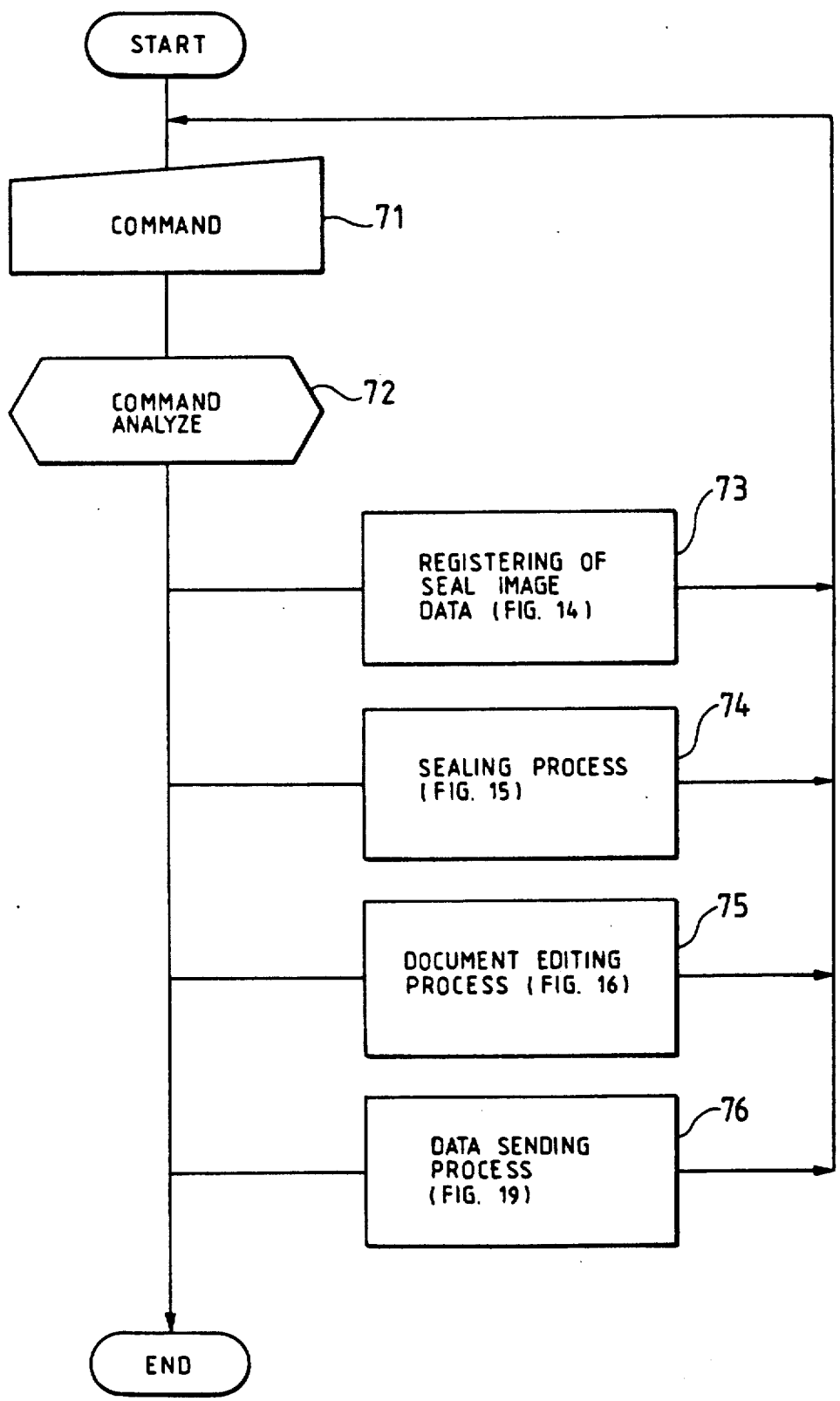
FIG. 13 is a flow chart showing a document processing program for use in executing document editing according to the present invention.

FIG. 13 is a flow chart showing a document processing program which is provided in each work station in order to execute the above-described editing of documents. This program receives a command input from a user (Step 71), then analyzes the command (Step 72), and then executes, in accordance with the kind of command, any one of a registration routine 73 for seal image data, a sealing routine 74, a document editing routine 75 and a data sending routine 76.

Figure 14:
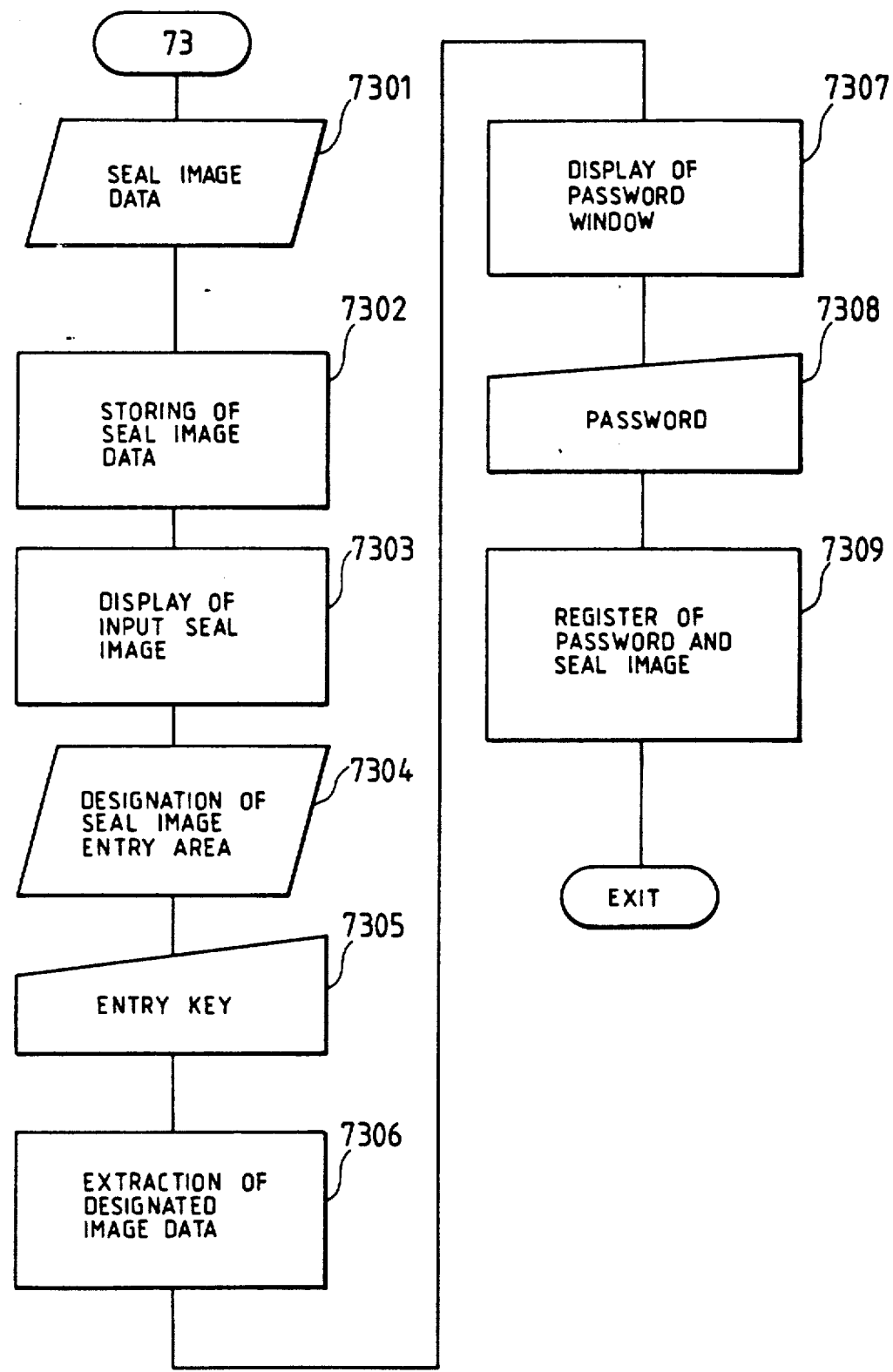
FIG. 14 is a flow chart showing the details of the registration routine, shown in FIG. 13, for seal image data.

FIG. 14 shows a detailed flow chart of the registration routine 73 for seal image data. In this routine, first, reading of the seal image which has been input from the image scanner by a user is effected (Step 7301), and the input is temporarily stored in the work area 12D (Step 7302). The input seal image data is, as shown in FIG. 5, displayed on the CRT display screen (Step 7303). The user employs a mouse 15 to designate an image area to be registered as seal image data (Step 7304) and depresses a registration key (Step 7305). Thus, the image contained in the designated area is extracted from the image input from the image scanner, and is prepared as seal image data to be registered. Then, the password input window 147 is displayed on the CRT display screen (Step 7307). When the user inputs a password which the user employs when he uses the above seal image data (7308), the password and the above extracted seal image data are registered in the memory region 12C in such a manner that they correspond to each other (Step 7309).

Figure 15:
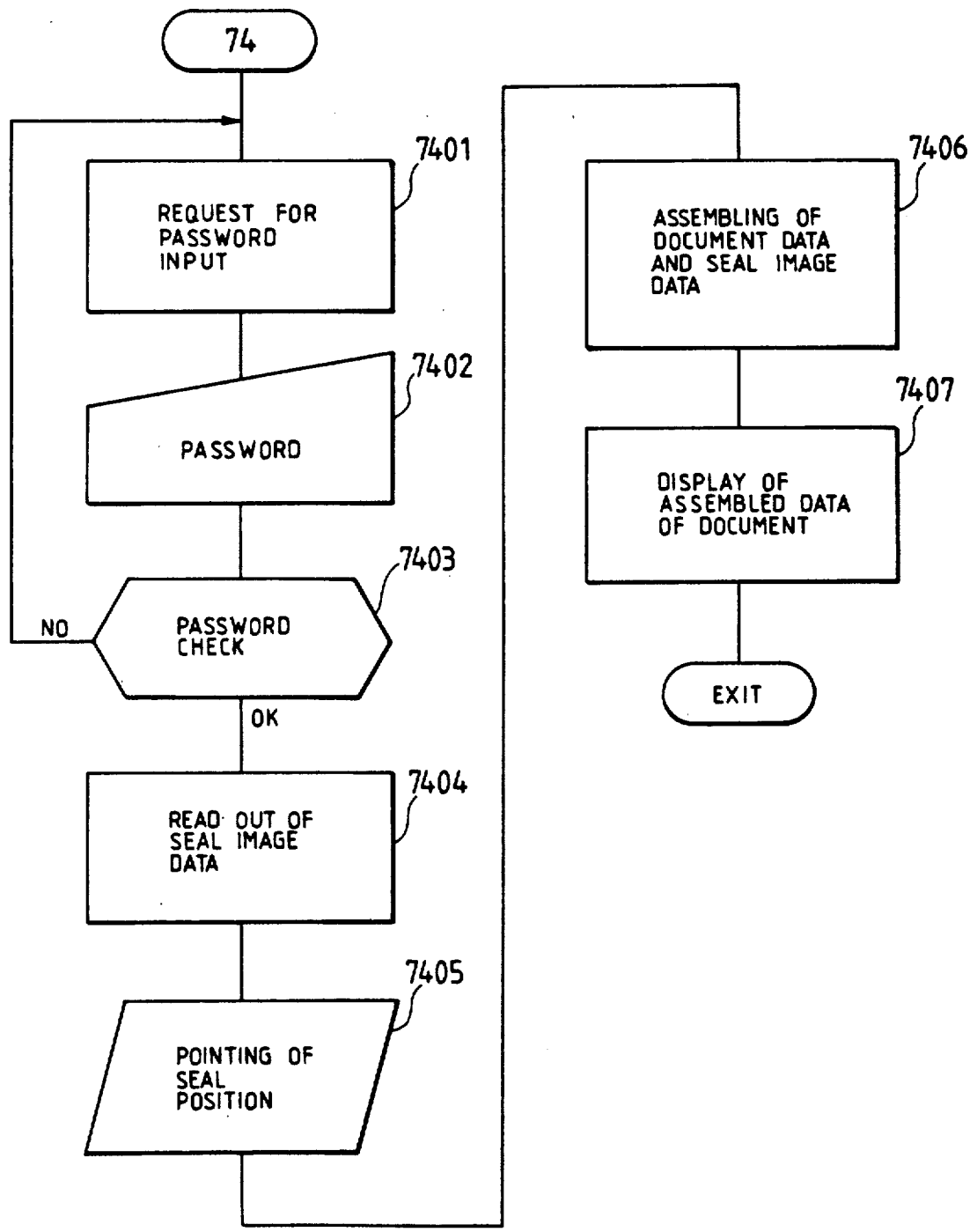
FIG. 15 is a flow chart showing the details of the sealing routine, shown in FIG. 13.

FIG. 15 is a flow chart showing the sealing routine 74 which is executed when the user utilizes the above registered seal image data to affix his seal to a designated position on the document.

When the user presses the sealing key 164, the sealing routine 74 is started. First, the sealing password input window 143 which has been explained in connection with FIG. 4 is displayed (Step 7401). When the user inputs his password (Step 7402), the password registered in the memory region 12C is searched. If a password coincident with the registered one is registered, a registered seal image data corresponding to the coincident password is read into the word area 12D (Steps 7403 to 7404). Then, when the user employs the mouse 15 to designate a position to be sealed on the document displayed on the document display window 142 (Step 7405), the region management data 54 and the seal image data 56 are created so as to incorporate the seal image data into the portion of the document corresponding to the designated position (Step 7406), and the sealed document is displayed on the CRT display screen (Step 7407).

Figure 16:
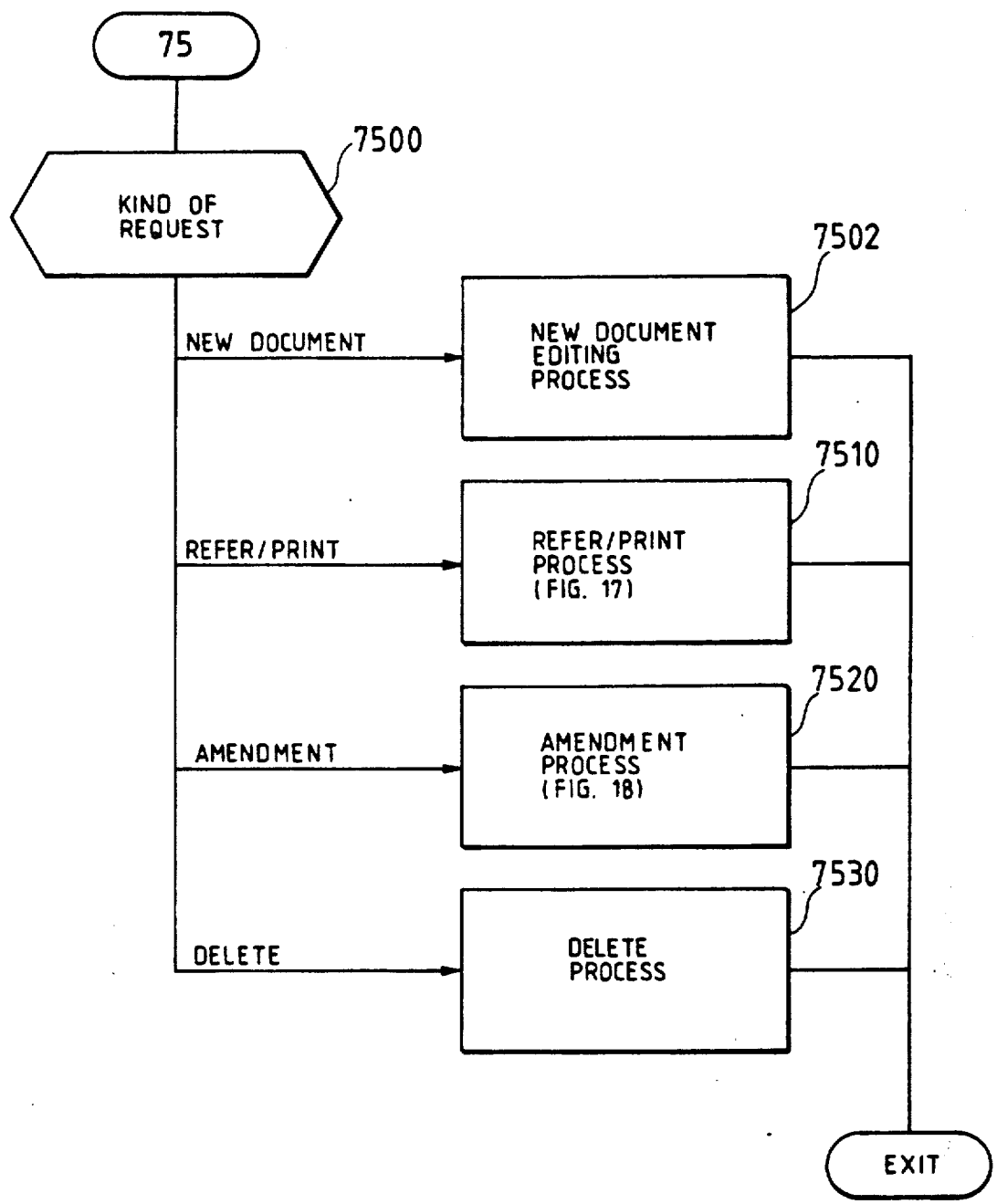
FIG. 16 is a flow chart showing the details of the document editing routine shown in FIG. 13.

FIG. 16 is a flow chart showing the document editing routine 75. In this routine, first, the contents of request for document editing which is input and designated by the user is analyzed (Step 7501). If creation of a new document is requested, a new document creating routine 7502 is executed. This routine has functions similar to those of an ordinary word processor. If the request of the user is a request for reference to or printing of a document, the refer/print routine 7510 shown in FIG. 17 is executed. In this routine, the name of a document to be read out or the identification number (or personal ID) of the user is input (7511). If the document name is input, the memory 12B and a document file 13 are searched (Steps 7512 to 7514) by means of the document name. If the personal ID is input, they are searched (Steps 7512 to 7514) by means of the personal ID. If the desired document is found, it is displayed on the CRT screen (Steps 7515 to 7516), while, if not, a message to that effect is displayed on the CRT screen (Step 7517).

When the desired document is searched by means of the personal ID, a check to determine whether or not the document sent to the user from another work station is present is performed.

In the document editing routine 75 of FIG. 16, if the user requests to amend the document, the amendment routine (7520) shown in FIG. 18 is executed. In this routine, it is first checked (Step 7521) whether or not a seal image is affixed to the document displayed on the CRT screen. The presence or absence of the seal image can be determined by checking the status flags 404 contained in the routing address data 40 or the field 544 representative of the kind of data contained in the region management data 54 of the same document. If no seal image is affixed, the document displayed on the CRT screen is edited and sealed in accordance with the operation of the user (Step 7525). If a seal image is affixed, the user is requested to input a document name to be added to the correct document in order to separately handle the original document and the corrected document. If the document name is input (Step 7522), a copy of document body data in which the seal image is removed from the original document is prepared and a new document name and a document data number are imparted to the copy (Step 7523). Thus, the document data without any seal image is displayed on the CRT screen (Step 7524). The user then amends the document data (Step 7525).

In the document editing routine 75 of FIG. 16, if the request from the user is a request for deletion of the document, a document deletion routine 7530 is executed and the document data displayed on the CRT screen is deleted from the file 13.

Figure 19:
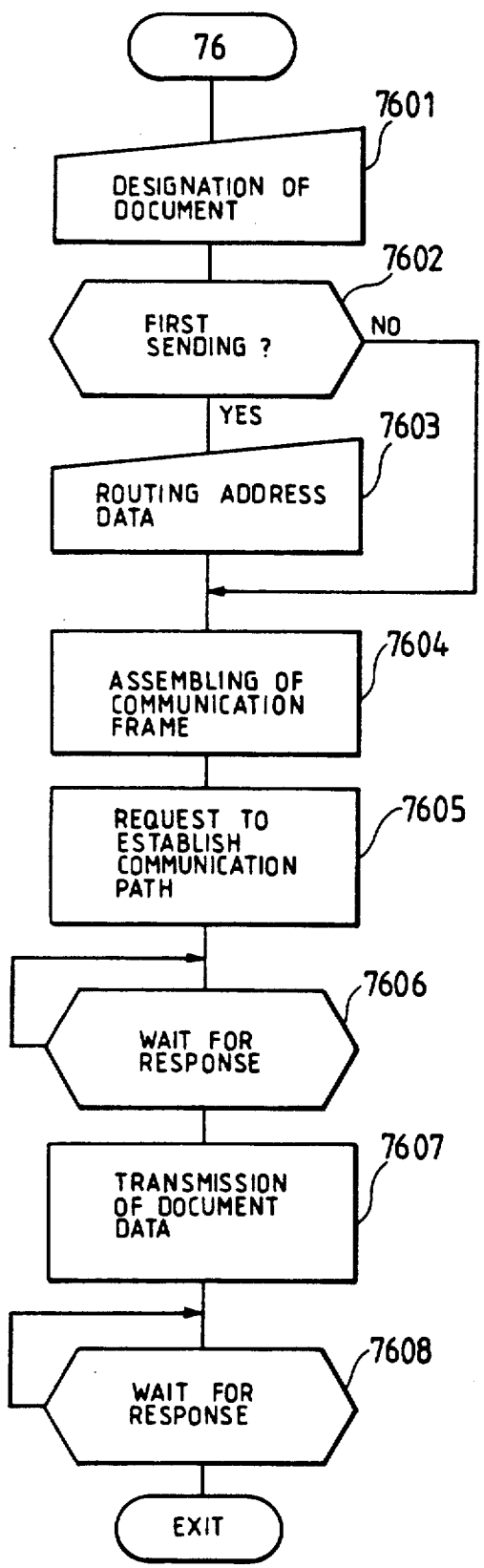
FIG. 19 is a flow chart showing the details of the document data sending routine shown in FIG. 13.

FIG. 19 is a detailed flow chart showing the data sending routine 76 for document data. In this routine, the user first designates a document to be sent (Step 7601). The designation of the document is performed by inputting the title 502 thereof or the document data number 500 through the keyboard. Then, it is determined whether the aforesaid document is the first one that will be sent after it has been created or the one that has been received from another work station and will be transferred to the succeeding work station (Step 7602). If the document is the first one to be sent, the user must input the items 400 to 405, by means of the window 144, from among the routing address data 40 which has been explained in connection with FIG. 10.

When the above inputting by the user has been completed, a communication frame containing the routing address data 404 and the document data 50 to 56 is assembled (7604), and a command to establish a communication path between the communication adapter 19 and the data switching server 20 is issued (7605). When a response indicative of the establishment of the communication path is transferred from the communication adapter 19, the aforesaid communication frame is sent through the communication adapter 19 (7607). When it is reported through the communication adapter 19 that a response indicative of the normal reception of the communication frame is received from the data switching server 20, the routine is completed.

Figure 20:
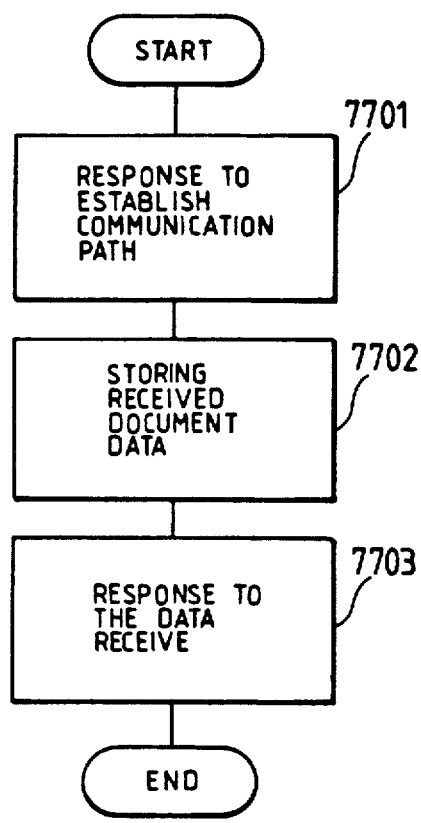
FIG. 20 is a flow chart showing a routine for processing reception of document data.

FIG. 20 shows the operation of receiving document data from the data switching server 20. When the data switching server 20 issues, to the work station 10, a request for establishment of the communication path required for sending the document data, information to that effect is transmitted from the communication adapter 19 to the processor (CPU) 11. The processor 11 issues, to the communication adapter 19, a response to establish the communication path (7701). The document data transmitted from the server 20 is accumulated through the communication adapter 19 (7702). Thereafter, a response to the reception of the document data is output to the communication adapter (7703), thus completing the above routine.

The above-described embodiment has the system construction in which a plurality of terminals (work stations) are connected to one another by the data switching server. However, the individual terminals may be connected directly to one another, and the one that has received a communication frame addressed to the same may edit the document received find the next destination terminal to which the communication frame should be transmitted, rewrite the destination address of the communication frame, and send it to the associated network, thereby circulating the electronic document in sequence. Furthermore, although the description of the aforesaid embodiment refers to the case where the seal image is used as the attest pattern, it is evident that other patterns, such as handwritten signatures, may be adapted.

What is claimed is:

1. A method of editing an electronic document by a reviewing person at a terminal, in which the reviewing person adds to the electronic document displayed at the terminal, an attest pattern indicating that said reviewing person approves said electronic document and then sends said electronic document to a succeeding person for subsequent review of the electronic document or to an originator of said electronic document, said terminal being connected to other ones through a network means, each of said terminals being provided with a document editing function means for editing said electronic document and said attest pattern, a display means for displaying said document with said attest pattern, an input means used for inputting data and commands by a person, wherein said plurality of terminals communicate to one another through a data distributing means connected to said network means, the method comprising the steps of:

sending a communication frame to said data distributing means from one of said terminals by which said electronic document is originated, said communication frame including the data of said electronic document, an attest pattern for the originator, at least one destination terminal address corresponding to said reviewing person, a sending terminal address corresponding to said originator of the electronic document and flag fields each for storing flag information indicating whether the review of said electronic document by one of the reviewing and originator persons is completed or not;

sending said communication frame from said distributing means to one of the plurality of terminals selected on the basis of said destination terminal address, said sending address and said flag information;

displaying said electronic document and the attest pattern of the originator, on a screen of said display means at one of a plurality of reviewing terminals which has previously received said electronic document from said distributing means;

removing automatically from said electronic document any attest pattern previously added to said electronic document and displaying said electronic document having no attest pattern on the screen in response to an input of a request command for amendment of said electronic document from said reviewing person;

amending said electronic document displayed on the screen and adding an attest pattern for said reviewing person to said electronic document in accordance with input operations by said reviewing person; and sending said communication frame to said distributing means, by said terminal which received said communication frame from said distributing means, after changing the flag information in one of said flag fields which is assigned for a person operating the terminal so as to indicate the reviewing is completed if the person has operated the terminal to add his attest pattern without amending said electronic document or after initializing all the flag information and previously appended attest patterns corresponding to the other person if the person has operated the terminal to amend the contents of said electronic document.

2. A method of editing in a communication network having a plurality of electronic workstations wherein the workstations communicate to one another through a data disturbing means associated with the communication network, the editing being accomplished such that identities of each editing person and amendments made by each person is known, the method comprising the steps of:

initially drafting on a display of one of said workstations an initial draft of an electronic document;

appending a first predetermined, personalized attest pattern to said electronic document, said attest pattern identifying a person who is a drafter of the electronic document;

storing said electronic document having said attest pattern in a memory location associated with said workstation;

sending a communication frame to said data distributing means from said one workstation used to draft the initial electronic document, said communication frame including data of said electronic document, the first attest pattern, at least one destination workstation address corresponding to at least one other workstation, a sending workstation address corresponding to said one workstation, and flag fields each for storing flag information indicating whether the drafting of said electronic document is complete;

sending said communication frame from said distributing means to said at least one other workstation selected on a basis of said destination address, sending address and said flag fields;

displaying said electronic document on a display of said other workstation, reviewing said accessed electronic document and performing at least one of;

approving said initial draft of said electronic document without any changes and adding a second predetermined, personalized attest pattern identifying a person who is a reviewer of the electronic document in response to the inputting of a command to add the second attest pattern at a designated position on the electronic document having said first attest pattern, and disapproving of said initial draft of said electronic document and inputting to said workstation a command to edit said electronic document; removing said previously added attest pattern from said electronic document in response to the inputting of a command to edit said electronic document; editing the electronic document, and, adding the second predetermined personalized attest pattern to the edited electronic document; whereby only the reviewing person's attest pattern is attached to the edited electronic document; and, storing said approved or edited electronic document having said second attest pattern such that it is available to other workstations in said communication network.

3. The method of claim 2 wherein the steps of accessing, reviewing and storing are repeated until a final electronic document is produced including attest patterns of a plurality of reviewers associated with said plurality of workstations.

* * * * *